United States Patent Office 2,947,619
Patented Aug. 2, 1960

2,947,619

RAPID COMPOSTING

Harry B. Gorby, Oklahoma City, Okla., assignor to American Dross Disposal Corporation No Drawing. Filed Mar. 22, 1957, Ser. No. 647,745

3 Claims. (Cl. 71—9)

This invention relates to composting and more particularly to the rapid composting of organic matter.

The disposition of refuse and garbage from industrial and community activities is an ever increasing problem. Most commonly, attempts to solve this problem have been by garbage feeding, incineration or sanitary landfill.

The feeding of garbage, in a raw state, to swine has been accompanied by trichinosis and vesicular exanthema to such an extent that legislation has been passed in many states to prohibit the feeding of raw garbage to hogs. Cooking the garbage overcomes the sanitary problem but increases the cost and produces a product of greater homogeneity whereby the hogs are less able to select the good from the poor material in cooked garbage.

Incineration of garbage is an expensive and organically wasteful method of waste disposal. The burning of garbage is accompanied by smoke and odor which removes the esthetic aspects of this disposal method and causes much of the "smog" so common around large cities.

Where sewage systems have sufficient capacity, garbage may be ground and added to the sewage for processing. This is also effected by the use of the garbage grinder found in many kitchen sink disposal systems. The disposition involves an increased cost to the community in the utilization of sewage plant capacity and in the loss of organic nitrogen fertilizer value in the garbage.

Dumping of garbage is still a significant but decreasing mode of garbage disposal. Such open dumping of garbage is unhygienic and wasteful of organic matter. Sanitary landfill disposal of garbage, places the garbage in trenches and covers the refuse with excavated dirt. This requires relatively large tracts of land for waste disposal, is impractical to do during inclement weather especially with frozen soil, and encourages a slow, anaerobic fermentation which sometimes takes years to decompose the garbage. During all this time, the garbage constitutes a serious possible health menace.

A minor proportion of garbage is rendered. The recovered garbage grease and residue do not have sufficient economic value to encourage the operation of this process.

The most practical approach to garbage disposal is the decomposition or stabilization of organic matter by microbiological action. Utilizing this process for the sanitary disposal and reclamation of organic waste material is termed composting and the final solid product is denoted as compost. The compost is a valuable soil conditioner and fertilizing agent.

Composting is an ancient process which has been utilized, especially in recent years, in Europe, Asia and Africa. As heretofore practiced, it required from six to twelve months for predominantly anaerobic fermentation to be completed. Under more controlled conditions in a warm climate, India has developed a modification of composting in which sewage sludge and manure were deposited alternately to form layers into heaps about four feet high. By turning these piles every few weeks, insufficient aerobic activity was promoted to complete composting in less than ninety days. Similarly, alternate layers of readily fermentable material such as manure, sewage sludge or garbage, with straw, or high cellulosic refuse could be processed. But a more rapid composting process requires more frequent turning to maintain aerobic conditions. In lieu of turning, specially designed equipment and containers have been devised by the art in an endeavor to introduce the requisite air for aerobic fermentations. Such installations have heretofore been expensive and troublesome. The alternative use of hand labor in processing of low cost material is often prohibitory.

The instant composting process involves the formation of organic material into piles or windrows without the need for any special supporting or containing equipment. It provides an extremely rapid composting process with a minimum of equipment. Essentially the new process involves the wetting, shredding and aerating of compost under conditions productive of a heretofore unattainable rapid and esthetic controlled aerobic fermentation. Because of the controlled operation, the process is odor free and unpalatable to rodents and productive of a high temperature, due to thermophillic fermentation, which is destructive of insect larvae, and pathogenic organisms. Although manual operation is practicable in small quantities, the process is amenable to the use of a mechanical device which slowly drives into a pile of organic matter for composting, whereby the material is picked up, wetted, shredded, aerated and reformed into a windrow, thus handling economically large volumes of material hourly and all without the nuisances heretofore associated with composting methods. After the major composting is complete, the material is allowed to remain undisturbed in a windrow to cure or finish the minor residual fermentation.

Extrinsic sources of microorganisms to initiate the fermentation have been found unnecessary. Garbage, sewage sludge and putrescible organic matter contain sufficient indigenous microorganisms to effect a suitable fermentation. In the event that a particular sample of material is too low in indigenous culture, inoculation is accomplished by the addition of a small proportion of sewage sludge or of partly fermented compost. The identification, culture or inoculation of pure microorganisms is completely unnecessary under the instant conditions of controlled fermentation.

At the outset, the moisture of the composting material should be adjusted. If the material is too dry, the rate of composting will be low. If the material is too wet, the void spaces in the pile will become filled with moisture and aeration will be impeded thereby resulting in a low rate of fermentation or even in causing anaerobic fermentation to proceed. Preferably, the composting material should contain about 40 to 60 percent moisture.

If the initial moisture content is too high, the material must be turned and aerated often, suitably at least once a day, to facilitate aerobic fermentation and drying. When available, low moisture content organic waste is added to the high moisture content material to provide the optimum moisture content. Due to aeration, evaporation and microbiological action, the moisture content of the composting material tends to decrease. This fermentative composting process is therefore efficient and economical for the moisture reduction of organic material. Following the same process as herein described, but without the addition of moisture, material which initially has a moisture content in excess of 35% is reduced to a moisture content of about 35% without the need for expensive equipment or external heating. The necessary heat is autogenously produced by the aerobic fermentation. If further dehydration is desired, mechanical dryers with an external heat or fuel source are provided to continue the drying to a level below 35% moisture. By combining this composting and mechanical dehydration, low cost dehydration is accomplished with increased capacity for the drying mechanism, and lower fuel consumption. In general, however, the addition of moisture to produce or maintain the best range for fermentation is desirable for complete composting.

Addition of moisture to a windrow of material by spraying causes severe crusting in the top layer of the pile. This encrustation inhibits the diffusion of air into and through the pile and retards or prevents aerobic fermentation. By the instant procedure, moisture is added without crust formation, and the fermentation is facilitated by maintaining a suitable moisture content without impairing the aeration. This critical moisture addition is accomplished by spraying or sprinkling the compost material with water, or other aqueous material for example sulfite paper waste liquor, while being picked up, shredded, or tossed through the air and permitted to fall to the ground. It is essential that the water be added and mixed in during this processing. The addition of moisture, by spraying or sprinkling is most effective and efficient when applied to the material after it is picked up and preferably immediately before, during and after the shredding operation but before the material has fallen to the ground to constitute another windrow. Succinctly, the material is most desirably wetted while in this dispersed and air-borne rather than windrow form.

The optimum pH for windrow composting is about 6.5 to 7.5. Commonly garbage, refuse, manure and other compostable material has an initial pH of 5 to 7. If the initial pH is far outside of this range it is adjusted to within the range if adequately inexpensive corrective material or waste are available. If desired, excess acidity is overcome by the addition of ash, carbonates or lime, but such addition is not necessary. Suitable aeration accomplished by frequent shredding and tossing is ordinarily adequate to cause the pH to rapidly adjust itself to best composting conditions.

Temperature for rapid-rate aerobic windrow composting is best maintained at a temperature of about 50 to 60° C. although temperatures as high as 70° C. and temperatures below 50 degrees are employable. Temperature control is exercised by the control of aeration. Commonly, a temperature of 45° C. is attained within the first 24 hours of composting and after two days, a temperature of 50 to 60° C. is reached which finally drops, indicating that either the process is becoming anaerobic or the primary fermentation is complete. Inspection readily exhibits the fact of completion or incompletion of the primary fermentation. If fermentation is incomplete, aeration is indicated to maintain aerobic fermentation. If fermentation is complete, the composted pile is stabilized and may be permitted to age or used as such for soil conditioner or fertilizer.

Composting material has good thermal insulating characteristics and therefore compost temperatures are surprisingly independent of ambient temperature. Composting is satisfactorily conducted under freezing atmospheric temperatures. It is merely desirable to avoid excessive intermixing of snow or ice with the composting material so that the microorganisms are not unduly chilled and their activity retarded. Where low ambient temperatures prevail, compensation is provided by building the windrows higher so that the greater mass as compared with surface area of compost is enabled to weather the atmospheric chilling and provide it's own insulation. Strong winds also have a cooling and drying action which can, if not overcome by increased rate of fermentation, be protected against by higher windrows.

Rain ordinarily presents no problem in windrow composting because the rain runs off the windrows. Especially following heavy rain, the compost is desirably shredded and reaerated to avoid incrustation and anaerobic conditions. During heavy rain, shredding and reaerating may be accompanied by unduly increased moisture content of the compost. In this event, the processing can be delayed until the rain stops.

The instant process requires such a short period of time for completion that it is practical to operate in a sheltered space preferably over an asphalt or concrete base. Thus, the process is completely independent of weather. Furthermore, the process is so esthetic and efficient that numerous small processing plants can, if desired, be operated throughout a municipality thereby reducing hauling costs and increasing total efficiency.

Density of composting material is a factor in the rate of composting. In accordance with the present invention, during the initial fermentation period, the composting material should not be shredded to a fine condition. An initially coarse shredding has been found conducive to improved starting fermentation. With each subsequent shredding the compost particle sizes are decreased to hasten decomposition without impairing the necessary aeration. Furthermore, under the instant conditions of operation, paper and other cellulosic material need not be disintegrated during the initial processing, the undisintegrated paper and cellulose aid in maintaining a desired high porosity of the compost mass. During the latter stage of fermentations the cellulose decomposes and is at that time more desirably in a finer state of subdivision.

While diffusion provides the major source of oxygen to the composting windrow, it is essential for rapid-rate composting to maintain a high porosity in the composting mass. A high porosity gives the composting material greater thermal insulating value, a higher proportion of entrapped air to aid in aerobic fermention, and improved opportunity for air to diffuse into the windrow. Porosity of the pile is controlled by the degree of shredding. With initial high moisture organic material, coarse shredding produces a pile containing approximately 50% of void. Porosity is also controllable by the height of the windrow pile, the method of establishing the pile and of course its moisture content and density. Too high a pile will compress the lower portions thereby producing a low porosity windrow with the consequent difficulty in maintaining the necessary aerobic fermentation conditions.

Ordinarily, the windrow pile should not exceed about 5 feet in height. Objectionable conditions caused by higher piling can to some extent be materially aided by more frequent shredding and aeration. The instant processing is especially desirable in that it builds a highly porous windrow by throwing the shredded material through the air and causing it to lightly fall and flutter into a fluffy pile.

Crusting of the surface of a composting windrow constitutes a serious inhibition to penetration of air into the pile. This crusting commonly has resulted whenever the prior art has attempted to add moisture to a windrow pile by spraying or wetting the surface of the pile. The resulting fermentation would be so greatly inhibited by wetting the windrow pile that the art has taught the avoidance of aeration when the compost moisture content was too low, thereby avoiding additional dehydration which would accompany aeration. Such an expedient obviously results in objectionable prolongation of the composting period. But the prior art had no recourse, for wetting the pile and turning it would result in crusting or excessive local moisture with accompanying anaerobic fermentation conditions. Crusting of the windrow is also produced by rainfall, snow, wind, high or low atmospheric temperature, and low ambient humidity. All of these causes of crusting are overcome by daily shreddings and aeration as herein described. This frequent aeration has not heretofore been practical because it would have resulted in excessive drying of the composting pile and impairment or even cessation of the fermentation.

Aerobic fermentation of a composting windrow is retarded by clumping of the material. Clumping is commonly caused by excessive compaction, however excessive moisture and careless turning of the material also produce clumping. By the instant, dispersed-state-wetting and flutter pile formation, adequate wetting without local dousing and windrow formation without compaction is achieved.

Composting windrows in accordance with the present invention should preferably have a height of from about 4 to 6 feet although higher or lower piles properly aerated can also be processed satisfactorily. The width of the base is not critical for this is a matter of convenience and the natural angle of repose of the composting material is satisfactory. In practice, a base width of about 8 to 10 feet has been found practical. A wider base would be less efficient in the utilization of ground space and would require unwieldly machinery for processing.

Conveniently a truck or tractor chassis is well adapted for carrying the desired equipment for efficient processing in accordance with this invention. This device should have a gathering means, for example a front end screw with right-hand and left-hand ribbon screws which will propel the windrow pile toward the center of the machine and onto a conveyor. The conveyor can be a drag chain or continuous belt. For increasing conveyor capacity, cross bars with externally projecting steel fingers may be used to facilitate greater volume of pick-up and transport. The composting material is conveyed backward and upward, if desired, over a magnetic separator which removes ferrous metals from the material. The material then is fed to a shredder.

A Kemp shredder has been found satisfactory for this purpose. This shredder is essentially a rotary, high speed, large diameter, vertical hammer chopper with wide tolerance chopping elements thereby providing increased fineness of shredding with increased fragility and age of the composting mass without requiring adjustment of the clearance. The chopping elements are yieldable to allow unshreddable material stone, metal, etc., to pass through the shredder without causing damage to the shredder.

The shredding decreases the composting material particle size, breaks up clumps of material to provide essential aeration, and finally tosses the air-suspended dispersed composting material through the air whereby it becomes further aerated and flutters to the ground in a porous pile.

A watering tank is suitably provided for appropriately wetting the material being processed. If desired, the tank contains agitation means to maintain in suspension such aqueous material as raw sewage sludge, pickle liquor, or paper mill waste liquor which is utilizable both for wetting and composting purposes. Aqueous ammonia, where nitrogen is needed to aid composting, can also be used in this stage.

The watering tank leads to spray outlets which are strategically located to wet the composting material just before the material is picked up, while the material is on the conveyor, while it is being shredded and after shredding while it is being tossed through the air and permitted to flutter to the ground.

As a matter of convenience, the use of fences between the windrows is desirable when paper is being processed, for example as a component of garbage, to prevent winds from carrying the paper away from the depositing windrow behind the shredder.

The instant rapid-rate composting process provides a high public health standard. The high temperatures and careful control efficiently and effectively destroy pathagenic microorganisms and insect contamination. The aerobic composting material is not palatable to rodents and therefore does not attract rodents.

A wide variety of materials can be suitably and rapidly composted in accordance with this invention. Best results are obtained when the ratio of organic carbon to available nitrogen is less than about 50. The effective ratio of carbon to nitrogen in municipal garbage or municipal refuse, inclusive of garbage and trash, or raw sewage sludge is within this value. Where necessary, additional fermentable material or wastes may be added or blended to facilitate fermentation. Materials which have too high a carbon content with respect to nitrogen may be brought within the desired ratio by the addition of ammonia, sewage sludge or other high nitrogen containing material.

The following examples are illustrative of the processes of this invention and are not to be taken as limiting.

*Example 1.—Animal manure*

Animal manure has a high density and moisture content and consequently requires daily turning and aerating during the initial phases of composting. After the moisture content has reached 50%, the material is turned every three days for fifteen days. With each turning moisture is added to maintain the moisture content to within 40 to 60%. This addition of moisture is by spraying water upon the composting material while it is in dispersed condition, while it is in a thin layer and being moved on the conveyor belt to the shredder, and while it is being shredded and tossed through the air to form a windrow. After the final turning, the material is allowed to cure in the windrow. During this curing stage cellulose decomposing microorganisms predominate. The moisture content at this time is advantageously increased to about 70% to facilitate cellulose decomposition. After curing from 10 to 30 days, the material is then removed and stored or sacked. If desired, the cured, composted, manure is dehydrated to achieve greater stability against caking.

*Example 2.—Separated municipal refuse*

Separated municipal refuse, in the United States, usually contains approximately 20% of paper by volume, a total moisture content of about 76% and a pH of 5.5. In the early phase of the composting process, this material is shredded and aerated once a day for three days to provide rapid dewatering to the desired 40 to 60% range. The pH commonly drops on the first day to about 4.5 but increases during the remainder of the composting process to an ultimate of about pH 7 or 8. Shredded, aerated and fluttered into a windrow, this material loses about 15% of moisture daily. At each processing or turning, therefore, moisture is added to maintain the 40 to 60% moisture range. After 6 days of turning with the accompanying shredding, moistening and aerating, as described in Example 1, the material is relatively stable and is maintained in a windrow for 6 more days, then turned and moistened and finally cured.

*Example 3.—Unsorted municipal refuse*

Unlike separated municipal refuse wherein 80% of the mass is fermentable organic matter, unsorted municipal refuse commonly contains from 1 to 20% of readily fermentable organic matter. The remainder is cellulosic, paper, cardboard, rags, cans, bottles, etc. This material requires an initial sorting and removal of the inorganic material. The residual organic material is passed through a hammermill or similar grinder and then windrow processed as described in Example 1. Alternatively the unsorted municipal refuse is placed into windrows and the large inorganic material is hand picked. Small ferrous material is then removed if desired, by a magnetic separator over which the material is passed. Unsorted municipal refuse customarily contains from 10 to 20% moisture and requires the addition of moisture, as described in Example 1, during the composting process, to bring the moisture content to 40 to 60%. The pH of unsorted municipal refuse is about 7.5 and drops very little during composting. This material is ordinarily of high porosity and requires turning every three days. With each turning, during the loading, conveying, shredding and fluttering into a windrow, moisture is added to return the approximately 15% moisture loss between turnings. Moisture addition as water or as raw municipal sewage sludge has proven satisfactory. After the fifth turning, the material is left in a windrow pile to cure and age.

Example 4.—Digested municipal sewage sludge

The high density and low porosity of digested municipal sewage sludge requires that it be turned every day for ten days. With each succeeding turning, moisture is added, as in Example 1, to bring the moisture content to between 40 and 60%. After the tenth turning, the material is permitted to cure undisturbed. Best results are obtained with a blend of equal parts of municipal refuse and sewage sludge. This provides the more desirable highly porous windrow pile. Such a blend requires daily turning for five day, with moisture added each time, followed by curing.

Example 5.—Sawdust

Sawdust by itself does not compost rapidly. Rapid composting is, however, achieved by adding to preferably dry sawdust the waste liquor from sulfate or sulfite paper processing. Commonly the liquor is ammoniated to increase the nitrogen content. A mixture, most desirably having a moisture content of 40 to 60%, is windrowed and permitted to reach a temperature of 40 to 45° C. The material is turned and moistened, as in Example 1, every three days for thirty days and then permitted to cure.

Example 6.—Cotton burs

Cotton burs are turned daily, with moisture addition, as described in Example 1, to a 40 to 60% level for ten days and then permitted to remain undisturbed for curing.

Example 7.—Castor bean hulls

Castor bean hulls are adjusted to a 40 to 60% moisture content, as in Example 1, and turned daily with addition of moisture to the dispersed hulls to maintain a 40 to 60% moisture content. After the tenth turning the material is left in a windrow to cure.

Example 8.—Pea vines

The stringiness of pea vines is first eliminated by hammermill grinding. The pea vines are then windrowed, as in Example 1, and turned daily with moisture addition, when necessary, to the dispersed state material to bring the moisture content to 40 to 60%. After ten turnings, the material is left in a windrow to cure.

Example 9.—Grape pomace

Usually grape pomace contains about 80% moisture and requires daily turning to reduce the moisture content and encourage aerobic fermentation. Moisture is added to the dispersed material, while turning, as in Example 1, to maintain the moisture at a 40 to 60% level. After six days of turning, the material is left in a windrow for six more days, turned again with moisture adjustment to 40 to 60% and then cured in the windrow without further turning.

Example 10.—Tomato pomace

The high moisture content of tomato pomace requires mixing with other organic material to produce lower moisture, higher porosity product. Sorted municipal refuse, straw, cotton, hulls, bark, tanning bark residue or sawdust are useful for this mixing. After adjusting the moisture content to 40 to 60%, daily turnings are made for ten days with the addition of moisture each time, as described in Example 1, followed by allowing the material to remain undisturbed in a windrow for curing.

Peach, apricot, pear and citrus waste and pomace are processed in the identical manner used for tomato pomace.

Example 11.—Packinghouse waste

Meat scraps are rendered according to processes known in the art. But paunch manure has constituted a considerable disposal problem. This paunch manure usually contains 90 to 95% moisture although some samples have been dewatered to a moisture content of 50%. Where the moisture content is high, lower moisture content organic material, such as garbage, is added to bring the moisture to 50%. This material is, as in Example 1, turned daily for ten days, water being added to the dispersed state to maintain a moisture content of 40 to 60%. After the final turning, the material is left in a windrow to cure.

I claim:

1. In a process for manufacturing compost composed of fermented organic waste material by rapidly aerobically fermenting municipal organic waste material, the steps consisting of elevating said waste material an appreciable distance above the ground; shredding said waste material while elevated to form coarse particles thereof; allowing said coarse, shredded particles to fall, by gravity, and deposit on the ground in the form of a porous windrow pile; spraying moisture on said coarse shredded particles during their fall to the ground, said moisture being sprayed on said falling particles to adjust the moisture content thereof to within the range of from about 40 to 60 percent by weight; allowing said moist, porous windrow pile to ferment aerobically while maintaining said pile at a temperature of from about 50° C. to 70° C. and a pH of from about 6.5 to 7.5, until primary fermentation is substantially complete and the moisture content of said porous windrow pile is reduced to about 35 percent; then reprocessing said coarse, shredded waste material by re-elevating, reshredding and redepositing said reshredded waste material, by gravity fall onto the ground, in the form of a porous windrow pile, and respraying said reshredded waste material with moisture during the fall thereof to readjust the moisture content thereof to within the range of from about 40 to 60 percent by weight; aerobically fermenting said reformed moist windrow pile again under said fermentation conditions until primary fermentation is substantially complete, said re-elevating, reshredding, redepositing and respraying steps being each carried out each time the moisture content of the reformed porous windrow pile of shredded waste material is reduced to about 35 percent by weight, said reprocessing being continued until said aerobic fermentation of said windrow pile is substantially complete; and recovering said completely fermented organic waste material compost.

2. The process of claim 1 wherein said moist porous windrow piles of shredded and reshredded organic waste material are maintained with a natural angle of repose at a height of about 5 feet and have a porosity of about 50 percent voids.

3. The process of claim 1 wherein said reprocessing consisting of the steps of re-elevating, reshredding, redepositing and respraying said organic waste material are all carried out, sequentially, at intervals of from 1 to 3 days until said aerobic fermentation of said moist, porous windrow piles is substantially complete.

References Cited in the file of this patent

UNITED STATES PATENTS

| 2,285,834 | Proctor | June 9, 1942 |
| 2,734,803 | Ruskin | Feb. 14, 1956 |
| 2,798,800 | Geraghty et al. | July 9, 1957 |
| 2,823,106 | Pierson | Feb. 11, 1958 |
| 2,878,112 | Morrison | Mar. 17, 1959 |

FOREIGN PATENTS

| 407,713 | Great Britain | Mar. 14, 1934 |
| 521,894 | Great Britain | June 4, 1940 |